US005707667A

United States Patent [19]
Galt et al.

[11] Patent Number: 5,707,667
[45] Date of Patent: Jan. 13, 1998

[54] SOUND INSULATED INJECTION MOLDING MACHINE

[75] Inventors: John Galt, Ontario; Martin Kestle, Everett; James Yetter, Etobicoke, all of Canada

[73] Assignee: Husky Injection Molding Systems Ltd., Canada

[21] Appl. No.: 579,049

[22] Filed: Dec. 7, 1995

[51] Int. Cl.⁶ .................................................. B29C 45/67
[52] U.S. Cl. ............................................ 425/589; 425/595
[58] Field of Search .................................... 425/589, 547, 425/595

[56] References Cited

U.S. PATENT DOCUMENTS

| | | | |
|---|---|---|---|
| 3,727,085 | 4/1973 | Goetz et al. | 310/54 |
| 3,914,630 | 10/1975 | Lloyd et al. | |
| 4,615,669 | 10/1986 | Fujita et al. | |
| 4,988,273 | 1/1991 | Faig et al. | |
| 4,994,700 | 2/1991 | Bansal et al. | |
| 5,052,909 | 10/1991 | Hertzer et al. | |
| 5,417,558 | 5/1995 | Heindel et al. | |
| 5,448,118 | 9/1995 | Nakamura et al. | |

OTHER PUBLICATIONS

Injection Molding for Injection Molding Professionals, Apr. 1996.

*Primary Examiner*—Tim Heitbrink
*Attorney, Agent, or Firm*—Bachman & LaPointe, P.C.

[57] ABSTRACT

A system having a cooled power unit assembly, preferably an injection molding machine. The system comprises a primary machine; an electric motor for providing power to at least one mechanism of the primary machine, preferably the injection molding machine. The electric motor exhibits an operating temperature and an operating noise level. A cooling liquid is provided for cooling the electric motor and regulating the operating temperature. Also, a cabinet for containing the cooling liquid adjacent the electric motor is provided. The cabinet has a device for placing the cooling liquid in a configuration for insulating a surrounding environment from any of the operating noise level which measures above a prescribed level.

26 Claims, 6 Drawing Sheets

FIG. 6A   FIG. 6B

| MACHINE | | MOTOR | | | |
|---|---|---|---|---|---|
| CLAMP (metric tones) | SCREW SIZE (mm) | HP | L (mm) | H (mm) | dBA |
| 160/225/300 | 35/42/60 | 50-75 | 920 | 200 | <63 |
| 500/600/750 | 70/85 | 100-150 | 1090 | 250 | <65 |
| 900/1400 | 100/110/120 | 200-250 | 1190 | 250 | <67 |
| 1650/2650/3650 | 1315/1675 | 300-500 | 1675 | 315 | <70 |

SOUND INSULATED INJECTION MOLDING MACHINE

BACKGROUND OF THE INVENTION

This invention relates to machines and power units therefor, and more particularly, to a machine having an enhanced sound insulated, energy efficient, compact and safe power unit which is a stand-alone unit comprising a liquid cooled sound insulated electrical motor, and even more particularly, to an injection molding machine including pumps that drive plasticating, injection, mold closing-opening, parts ejection, clamping, and parts handling units, which are powered by the power unit.

The plasticating, injection, mold opening-closing, ejection and the clamp units of a molding machine in general may be actuated using mechanical, hydraulic and electrical means or any combination thereof. A mechanically actuated injection molding machine is disclosed in U.S. Pat. No. 4,615,669, wherein several electrical motors are used to transmit initial movement to several actuating mechanisms. Mechanical solutions are generally slow, making them unsuitable for many applications that require reduced molding cycle times.

In the last decade, attempts to replace the hydraulic means that provides power to the injection and clamp units by all electric means have been reported by several manufacturers. So far, the electric injection molding machines represent just a small niche due to design limitations which limit their application to 400 ton maximum machines and are generally used, therefore, for rather specific applications.

In these hydraulic injection molding machines of limited use, energy is typically input to the machine in the form of electrical energy. Much of this energy is converted into hydraulic flow energy by means of a hydraulic pump driven by an electrical motor. Recent market surveys indicate that the hydraulic molding machines represent the vast majority of machines in use regardless to the specific application or resin in use.

Regardless of which actuation means is used, a major and still unresolved problem which relates to any injection molding machine is the high level of noise generated by the injection unit, the clamp unit (during mold closure), the electric and hydraulic power systems, the ejection unit and the automatic handling equipment and combinations of this equipment. The noise level is specific to each injection molding machine and is considered a major source of labor related disease in the machine manufacturing industry and other related sectors such as plastic injection molding.

Noise from the injection molding machines is caused by many sources including hydraulic pumps, electrical motors, valves, air thrusters used for part ejection, various types of bangs during mold engagement and falling parts. To achieve significant noise reductions, the contribution of each source must be determined and accordingly noise reduction solutions have to address the individual sources to quiet the overall machine. Prior art hydraulic injection molding machines comprise noise insulation means such as partial acoustical enclosures around the electrical motors and hydraulic pumps, redesigned or silenced air thrusters, and acoustic absorbing linings inside machine enclosures.

The current legislation in regard to the noise level and duration of exposure in machinery industries vary from country to country or within a country from one jurisdiction to another. In the USA, for example, the Threshold Limit Values (TLV) for Noise indicates that for an exposure duration of 8 hours/day, the noise level should be lower than 85 dBA, while for an exposure duration of 7 minutes/day, the sound level should be lower than 115 dBA. In Canada the Current legislation of the Ontario Occupational Health and Safety Act, requires that unprotected workers shall not be exposed to noise levels greater than or equal to 90 dBA for an exposure duration of 8 hours/day. These values, while Government standards, may still be unacceptable for certain individuals. Therefore, even lower dBA noise values should be enforced or at least achieved. In order to build injection molding machine that meet actual and future TLVs standards, an injection molding machine has to have a TLV for noise of maximum 75 dBA for an exposure of 8 hours/day.

In the prior art, much effort has been dedicated to reducing noise level, energy consumption and the footprint of hydraulic injection molding machines. Many solutions have been disclosed to achieve these goals, but very few emphasize improvements at the level of the electrical motor that drives the hydraulic pump. In this regard, U.S. Pat. No. 4,988,273 and U.S. Pat. No. 5,052,909 are exceptions and they teach an energy-saving injection molding machine which includes a hydraulic pump driven by a brushless DC motor. This motor is claimed to be more energy efficient compared to the variable speed AC motors previously taught in the patent literature. Nevertheless, the noise level and the footprint are the same when using any of these two devices since both use air as a cooling agent.

Liquid is known in general to be a more efficient cooling agent than air since it absorbs and carries heat rather than releasing it in the surrounding atmosphere. Liquid cooled electrical motors are well known in the art, such as those disclosed in U.S. Pat. No. 3,914,630, U.S. Pat. No. 4,994,700 and U.S. Pat. No. 5,448,118. These motors use either water or oil as cooling agents. Various electrical, liquid cooled motors have been in use for many years in several fields, but sparingly with injection molding equipment.

FIG. 1 shows a prior art all electric injection molding machine, for low tonnage, maximum 300 tons that uses induction-type a-c servomotors (I-AC-SM). The injection unit is made of barrel (1), plasticating screw (3) injection nozzle (2). Movable platen (5) and fixed platen (4) hold the molds' halves (7,9). This machine comprises separate motors for plasticating (10), injection (6), mold opening-closing (12) and parts' ejection (11), each fitted with controls according to the particular function. Since the a-c-servomotors are air cooled, the energy consumption of this machine is very high and with at least four accurate servomotors, the machine is also rather noisy and very expensive.

FIG. 2 shows a schematic view of a prior art all electric injection unit of a molding machine as disclosed in the U.S. Pat. No. 5,417,558 of Battenfeld. The metering drive (15) that turns plasticating screw (3) is powered by a liquid-cooled (19) electric servomotor (17). The injection step is achieved by axially moving screw (3) inside and relative to barrel (1), using two drives powered by two similarly liquid-cooled (21) electrical servomotors (20) that operate synchronously. The injection nozzle (2) is axially moved relative to barrel (1) by two drives powered by two other similarly liquid-cooled (25) electrical servomotors (23), also operated synchronously.

This solution is applicable only to small machines and requires too many very accurate and expensive liquid cooled electrical servomotors and dozens of dedicated mechanical and electronics parts and connections. The arrangement creates service problems when it comes to replacing the defective motors, since one may not be able to keep still good but older motors, in order to preserve the mechanical balance of the parts' movements in the injection process. This solution is also very problematic when it comes to removing the barrel or the plasticating screw from the injection unit. Also, too many water and servicing conduits connected to the servomotors make the assembling and service processes very difficult to handle and control in the field.

Additionally, this invention does not disclose that the liquid-cooled servomotors have been designed to meet certain sound insulating standards. Considering that there are at least five such motors, the noise level could be very high. This may explain the use of this injection molding machine inside a fully isolated closure. The disclosure also fails to teach the power unit and the kind of motors used for the clamp, mold opening-closing or ejection disclosed in the present invention.

FIG. 3 shows a prior art hydraulic injection molding machine (4) comprising a power pack (25), which comprises a sound insulated metallic closure (24), for generating power. The main electrical air cooled motor (EACM) (30) drives the extruder pump EP (34) and the system pump (SP) (32). Both are in hydraulic power connection with power manifold PM (39) that delivers hydraulic power services to the injection unit via injection manifold (IM) (37) and to the clamp unit via clamp manifold (CM) (35). The electrical air-cooled motor (EACM) (30) produces noise above the accepted safety standards, i.e. more than 90 dBA. To reduce the noise level around hydraulic injection molding machine (4) mainly caused by EACM (30), metallic closure (24) is further provided with sound absorbing lining (27). By using the combination of metallic closure (24) and sound absorbing lining (27), the noise level around the injection molding machine drops to 85 dBA for large tonnage molding machines, which is still unacceptable for many applications. In any event, since air is not a very effective cooling medium, motor (30) is also not properly cooled.

A battery having more than 4 ventilation fans (29) is attached to metallic closure (24) to improve the motor's cooling system. While this solution lowers the temperature of the motor, it is not sufficient since sound absorbing lining (27) behaves also as a heat insulator. Therefore, inside metallic closure, temperature T2 is still too high and the air humid. The cooler air of temperature T1 provided by electrical fans (29) will become hot air T2 inside metallic closure (24) due to heat produced by motor (30). This hot air is then expelled into the surrounding environment through perforated panel (26), at temperature T3, which is much higher than the air-conditioned temperature T4 in the injection molding plant. Accordingly, the overall air conditioning system of the plastic injection molding plant has to be versatile enough to cope with this additional heat source, requiring increased energy use.

In conclusion, using a metallic closure and sound absorbing lining is not an effective solution since (1) the level of noise is still too high, (2) the air-cooled electrical motor remains hot and this may become a problem in long run operations, (3) the additional electrical fans represent an additional consumer of energy and a new source of noise, (4) the hot air expelled in the surrounding medium creates additional ventilation and air-conditioning problems as well as increased energy consumption, and (5) the footprint of this machine is very large thus allowing fewer injection molding machines which can be safely accommodated within the plant's floor.

Taking into account that liquid cooled electrical motors represent a more energy efficient and power supply and considering the shortcomings of prior art injection molding machines regarding power supplies, as discussed above, research and re-design efforts have been put together by the assignee of the present invention to develop an optimal power unit which is both energy and cooling efficient while having a noticeable reduction of noise level. Even though liquid-cooled electrical motors are commercially available, they are not known to have been used in conjunction with the hydraulic pumps of an injection molding machine in the manner of the present invention. The noise insulating features of electrical motors of the prior art are either non-existent or at least not very effective. Accordingly, such known electrical motors as off-the-shelf equipment cannot be effectively used in an effort to meet the objects of the present invention.

There exists a need, therefore, for an injection molding machine having an independent and stand alone power unit, in which a liquid cooled electrical motor is used in conjunction with a hydraulic pump to drive the movable units and which is effectively sound insulated, more energy efficient, has a smaller footprint and is safer.

SUMMARY OF THE INVENTION

The main object of the present invention is to provide a hydraulic injection molding machine having an improved and simpler sound insulation means.

Another object of the present invention is to provide a hydraulic injection molding machine that is compact, versatile, and easier to operate, assemble and service.

Still another object of the present invention is to provide a hydraulic injection molding machine comprising means for quick screw and barrel change.

And still another object of the present invention is to provide a hydraulic injection molding machine comprising electrical driving means for the hydraulic pumps that saves energy and that is more reliable in long run operations as compared to prior art devices having the same horse power output.

Still another object of the present invention is to provide a hydraulic injection molding machine that is safer and environmentally friendlier.

And yet another object of this invention is to provide an injection molding machine power unit assembly having sound insulated and cooled electric motor meeting and bettering industry standards.

And yet another object of this invention is to provide an injection molding machine power unit assembly having sound insulated and cooled electric motor meeting and bettering industry standards.

The objects and advantages discussed herein are achieved by the system disclosed herein having a cooled power unit assembly. The system comprises, a primary machine; an electric motor means for providing power to at least one mechanism of the primary machine, wherein the electric motor means exhibits an operating temperature and an operating noise level; liquid means for cooling the electric motor means and regulating the operating temperature; and means for containing the liquid means adjacent the electric motor means, wherein means for containing includes means for placing the liquid means in a configuration for insulating a surrounding environment from any of the operating noise level which measures above a prescribed level.

In one preferred embodiment, the system is an injection molding machine comprising an injection unit; a clamp unit for clamping molds; at least one hydraulic pump for driving the injection and clamp units; an electric motor means for powering the at least one hydraulic pump, the electric motor means exhibiting an operating temperature and an operating noise level; liquid means for cooling the electric motor means and regulating the operating temperature; and means for containing the liquid means adjacent the electric motor means, wherein the means for containing has means for placing the liquid means in a configuration for insulating a surrounding environment from any of the operating noise level which measures above a prescribed level.

The present invention discloses an injection molding machine that uses for the first time a liquid cooled electrical motor to power the hydraulic pump that provides services to the injection and/or mold units which motor is cooled and sound insulated for meeting and bettering industry services. Using a liquid cooled electrical motor has been motivated by several criteria, the reduced noise level being the most important one.

As a result of an in depth engineering study, the above innovative power unit for injection molding machines has been designed based on a liquid cooled AC motor which meets the following criteria: (1) reduced noise level, (2) increased energy savings, (3) minimum footprint (floor space), (4) fewer parts, (5) faster assembling-servicing, (6) ecologically friendly and (7) very safe in use.

BRIEF DESCRIPTION OF THE DRAWINGS

FIG. 6A shows a schematic elevational view of the water-cooled electrical motor of the present invention;

FIG. 6B is an end view taken from line 6B—6B of FIG. 6A;

DETAILED DESCRIPTION OF THE PREFERRED EMBODIMENT

Figure 1:
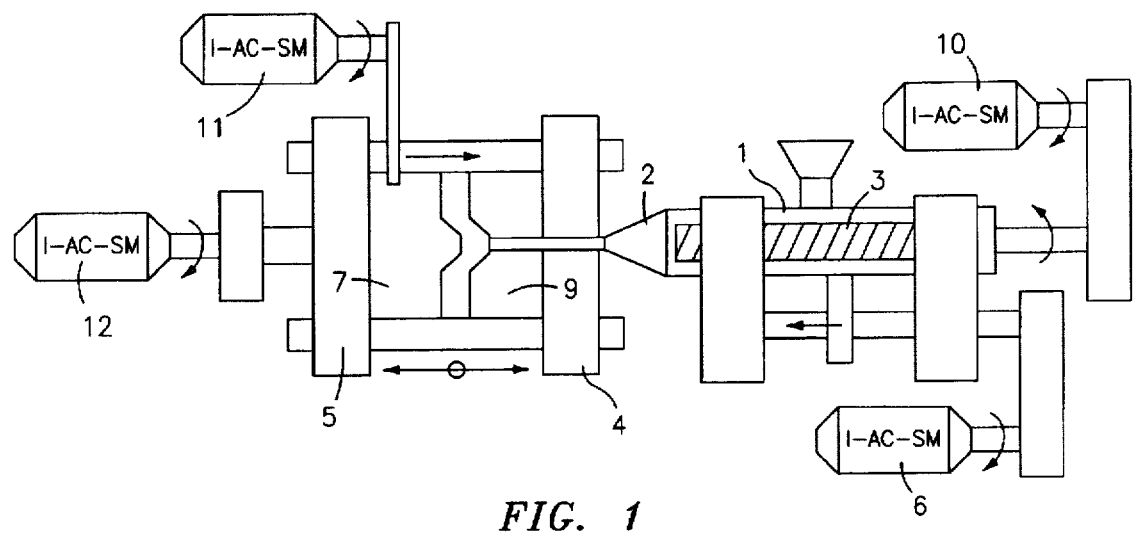
FIG. 1 shows a schematic view of a prior art all electrical injection molding machine that uses separate air cooled A-C servomotors for each of its injection unit, plasticating unit, mold opening-closing unit and ejection unit.
Figure 2:
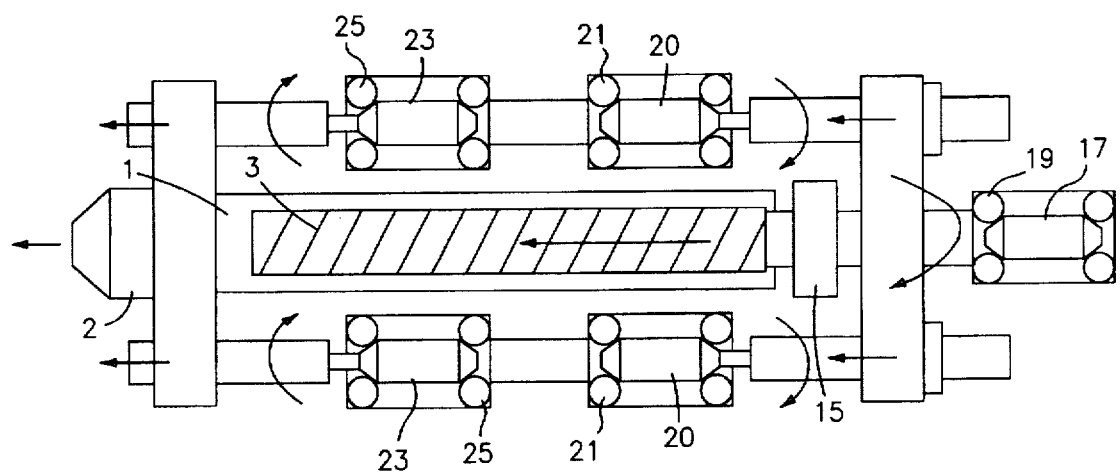
FIG. 2 shows a schematic view of a prior art all electrical injection unit that uses separate liquid cooled electrical servomotors for each of its movable units, i.e. its injection, plasticating and nozzle units.
Figure 3:
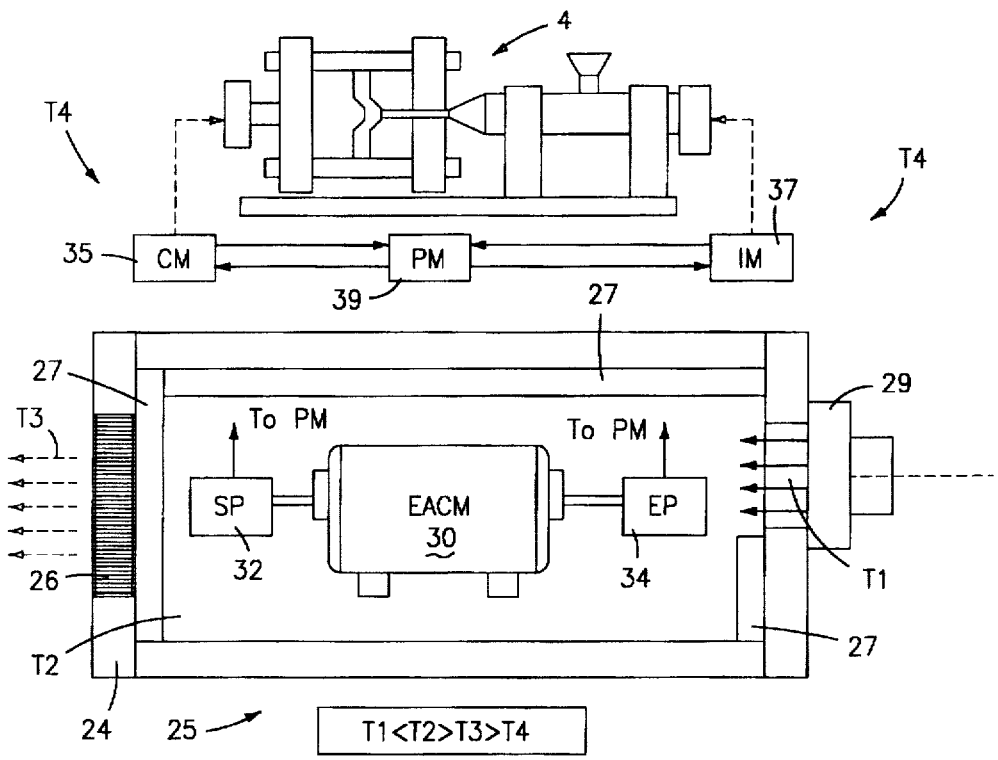
FIG. 3 shows a schematic view of a prior art hydraulic injection molding machine that uses a sound insulated power unit closure that comprises an air-cooled electrical motor to drive the hydraulic pumps that power the movements of the injection, molding and the clamping units.
Figure 4:
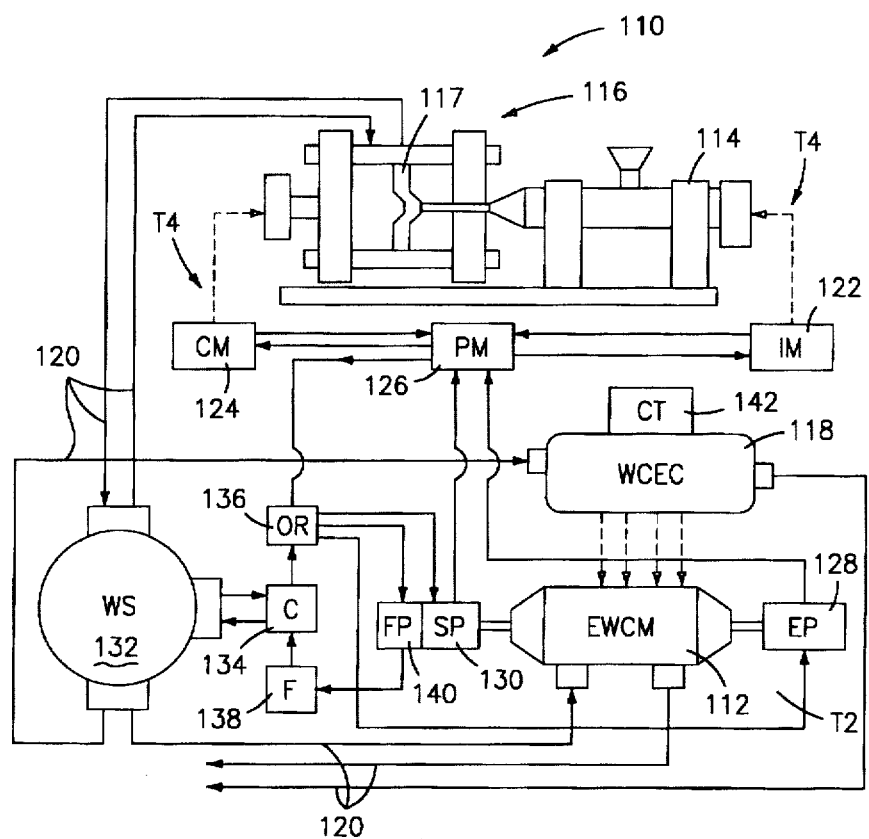
FIG. 4 shows a schematic view of an improved injection molding machine in accordance with the principles of the present invention that uses a power unit that comprises a sound insulated liquid-cooled electrical motor to drive the hydraulic pumps that power the movements of the injection, mold and clamp units.
Figure 5:
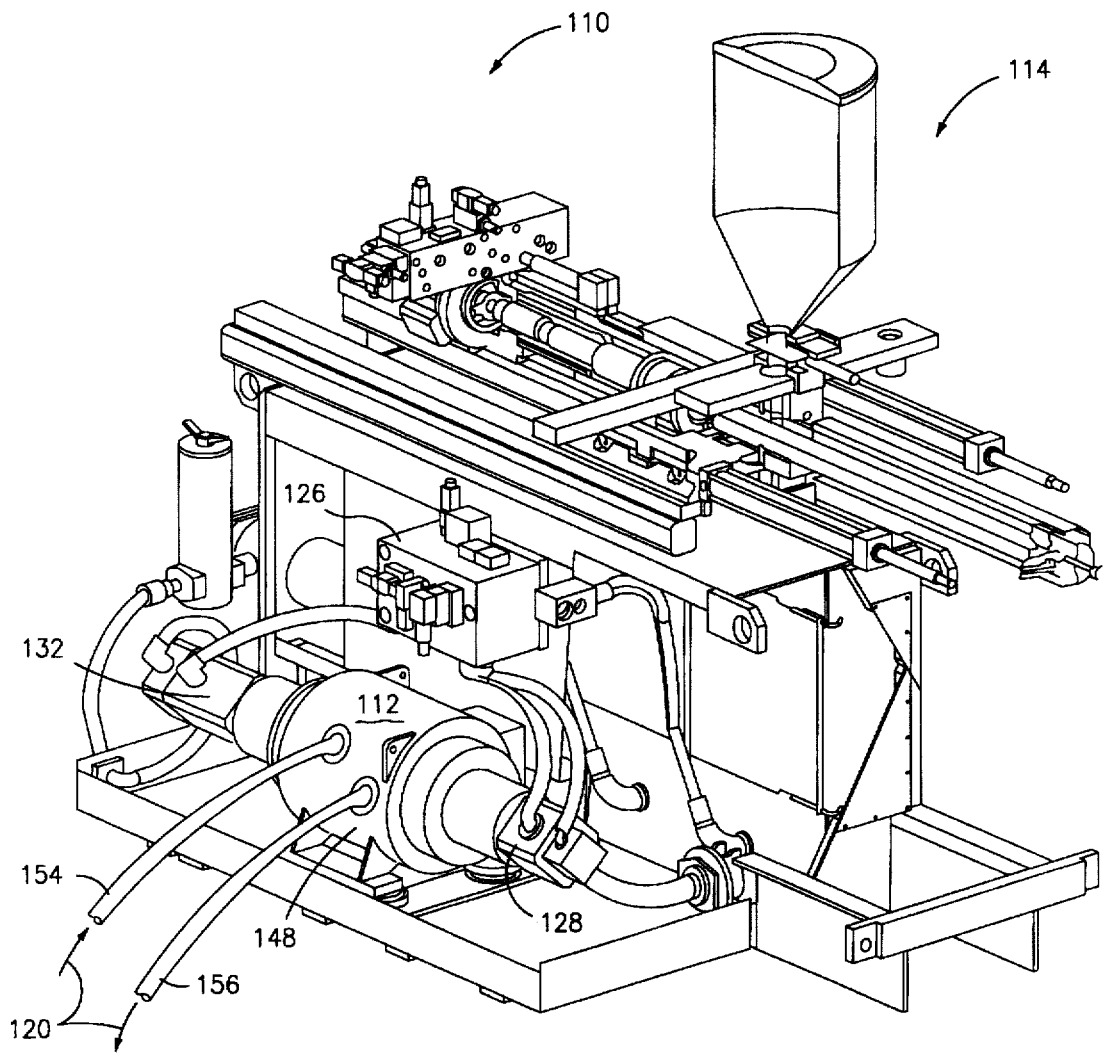
FIG. 5 shows a perspective view of the injection unit and of the power pack unit of the machine shown in FIG. 4, including the water-cooled electrical motor.

Referring now to the drawings in detail, there is shown in FIGS. 4 and 5 a schematic and detailed perspective view, respectively, of an injection molding machine in accordance with the principles of the present invention, designated generally as 110.

This invention is described in detail with primary reference to injection molding machines by way of an example. However, this invention is also directed to machines in general which require for their operation, cooling and noise reduction units.

Injection molding machine 110 generally includes an electrical liquid cooled motor (EWCM), preferably water cooled, 112, which is used to drive the hydraulic pumps (128, 130, 140) and power the mechanical moving parts of machine 110, an injection unit 114, a clamp unit 116, and mold 117, a liquid cooled electrical cabinet (WCEC) 118, preferably water cooled, and a coolant 120, preferably water.

Injection unit 114 is hydraulically powered via an injection manifold (IM) 122 and clamp unit and mold 116 is hydraulically powered via a clamp manifold (CM) 124, wherein injection manifold (IM) 122 and clamp manifold (CM) 124 are hydraulically connected to a power manifold (PM) 126. Extruder pump (EP) 128 and system pump (SP) 130, are used to drive the power manifold (PM) 126, all hydraulic, wherein extruder pump (EP) 128 and system pump (SP) 130 are directly electrically connected and controlled by electrical water cooled motor (EWCM) 112. Preferably, a single coolant source (WS) 132 is used to circulate and supply coolant or water 120 for tempering electrical water cooled motor 112, water cooled electrical cabinet 118 and molds of clamp unit and mold 116. While the coolant is preferably water, other liquids such as oil can also be used as a cooling agent. Water is preferred since it is cleaner, easier to handle and is typically used anyway to cool the mold. A cooler (C) 134 is used to maintain coolant 120, as indicated preferably water, at the desired temperature during the operation of injection molding machine 110.

In addition to the above, an oil reservoir 136 is used to supply oil to the hydraulic pumps and a filtering mechanism (F) 138 and a pump (FP) 140 are further provided for use with the hydraulic system. Finally, a controller (CT) shown schematically as 142, is provided for use with water cooled electrical cabinet 118 for sending commands to electrical water cooled motor 112 for controlling the rate and amount of cooling therein depending on the operating temperature of the motor, the desired amount of cooling, and the horsepower or size of the motor. Therefore, in accordance with commands from controller 142, the supply of coolant from source 132 to cabinet 118 is increased or decreased.

In addition to the above, injection molding machine 110 includes a quick coupling device for exchanging its plasticating unit, as shown in FIG. 5. This device is described in U.S. Pat. No. 5,011,396, assigned to the assignee of the instant invention and is hereby incorporated herein by reference.

Referring to FIGS. 6A & 6B, electrical water cooled motor 112 preferably comprises a three phase induction motor having a squirrel cage. Preferably only one such motor is used with machine 110. Water cooled electrical cabinet 118 is also preferably a steel welded motor frame and comprises a chamber 144 for the circulation therethrough of coolant 120 and for containing coolant 120. As shown in FIG. 6B, chamber 144 preferably has a configuration for encircling electric water cooled motor 112, having concentric inner and outer cylindrical walls 146 and 148, respectively, with a space 150 therebetween for the circulation of coolant 120. This configuration functions to allow coolant 120 to act also as a sound insulator, for reducing operation noise from the standpoint of the surrounding environment and also function as a heat exchanger, preferably maintaining the operation temperature of motor 112 to less than 4020 C.

Chamber 144 is also preferably plastic coated so as to avoid deterioration thereof. Drain holes (not shown) are provided for insuring proper drainage of any condensed water which may accumulate in chamber 144. The size of chamber 144 and the quantity of cooling water circulated therethrough is dependent upon the horsepower of electrical water cooled motor 112. In accordance with structural demands, controller 142, therefore, shown schematically, automatically increases the amount of coolant and its flow rate, if the temperature increases with respect to a certain threshold value, in order to protect the motor 112 from overheating. An inlet 154 and an outlet 156 are provided in water cooled electrical cabinet 118 for the input and output, respectively, of coolant 120 with respect to chamber 144. Temperature T4 is indicative of plant temperature and temperature T2 is indicative of the internal temperature of the power unit, including motor 112 and cabinet 118. In accordance with the cooling achieved using the chamber design and motor and cabinet discussed above, T2 substantially equals T4.

An enclosure can be used to cover motor 112 and the hydraulic pumps that would be necessary only for safety and aesthetic reasons and not for noise, reduction or cooling.

In addition to cooling, chamber 144 of electrical motor 112, when filled with and configuring a circulating coolant 120 such as water, as shown, is an excellent and innovative sound absorption medium for reducing operating noise, preferably to a prescribed level.

Accordingly, sound waves are known to be longitudinal and the speed of sound is known to depend on both an inertial property of the medium in which it is traveling, to store kinetic energy, and an elastic property of the medium, to store potential energy. Even though the density of water is almost 1000 times greater than the density of air, the speed of sound in water (1402 m/s) is considerably higher (more than three times) than in air (331 m/s) because the bulk modulus of water is about 1000 greater than the bulk modulus of air. Based on the properties of these two media, water and air, a certain amount of a sound wave's energy or intensity decreases through absorption in the water when the sound travels from air to water. This attenuation by a liquid may be used, therefore, to insulate the noise generated by some sources such as with an electrical motor, as disclosed herein.

Figure 6C:
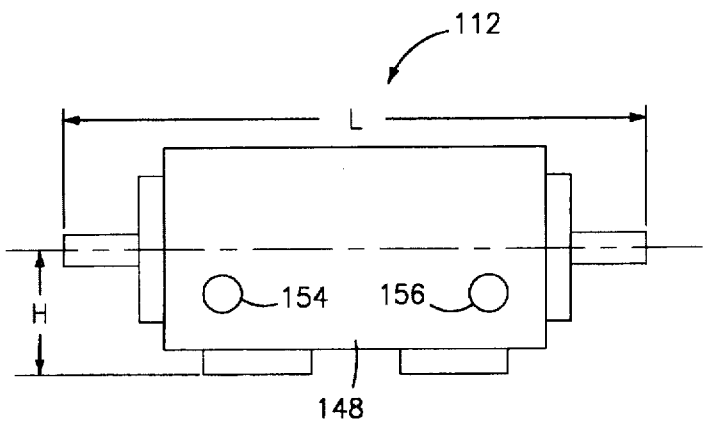
FIG. 6C is a table providing values including machine size, electric motor horsepower, length, height and noise level.
Figure 6C:
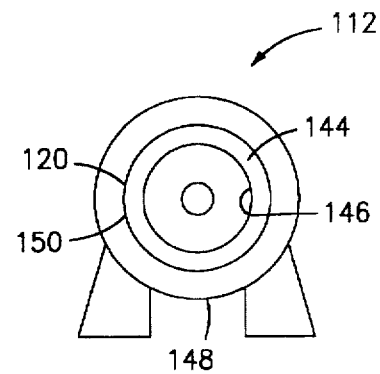

Taking into account that the sound noise generated by this kind of motor is neither coherent nor generated by a "small" source, the particular design of the water chambers and conduits may greatly improve the sound insulation characteristics of the electrical motor. This explains rather large differences among noise levels generated by liquid-cooled motors developed by various manufacturers for cooling but without attention to noise reduction or injection molding machines. For the application of liquid cooled electrical motors in an injection molding machine in accordance with the present invention, significant noise insulating improvements have been obtained by the optimum design disclosed herein of the water chambers, with regard to shape, thickness, etc., as indicated in FIG. 6C for motor 112. The design described herein meets three major criteria, i.e., (1) improved cooling efficiency, (2) better sound insulation achieved through an optimum size, (3) compact size, preferably having an increased length rather than an increase in diameter for optimum floor space savings.

Figure 7:
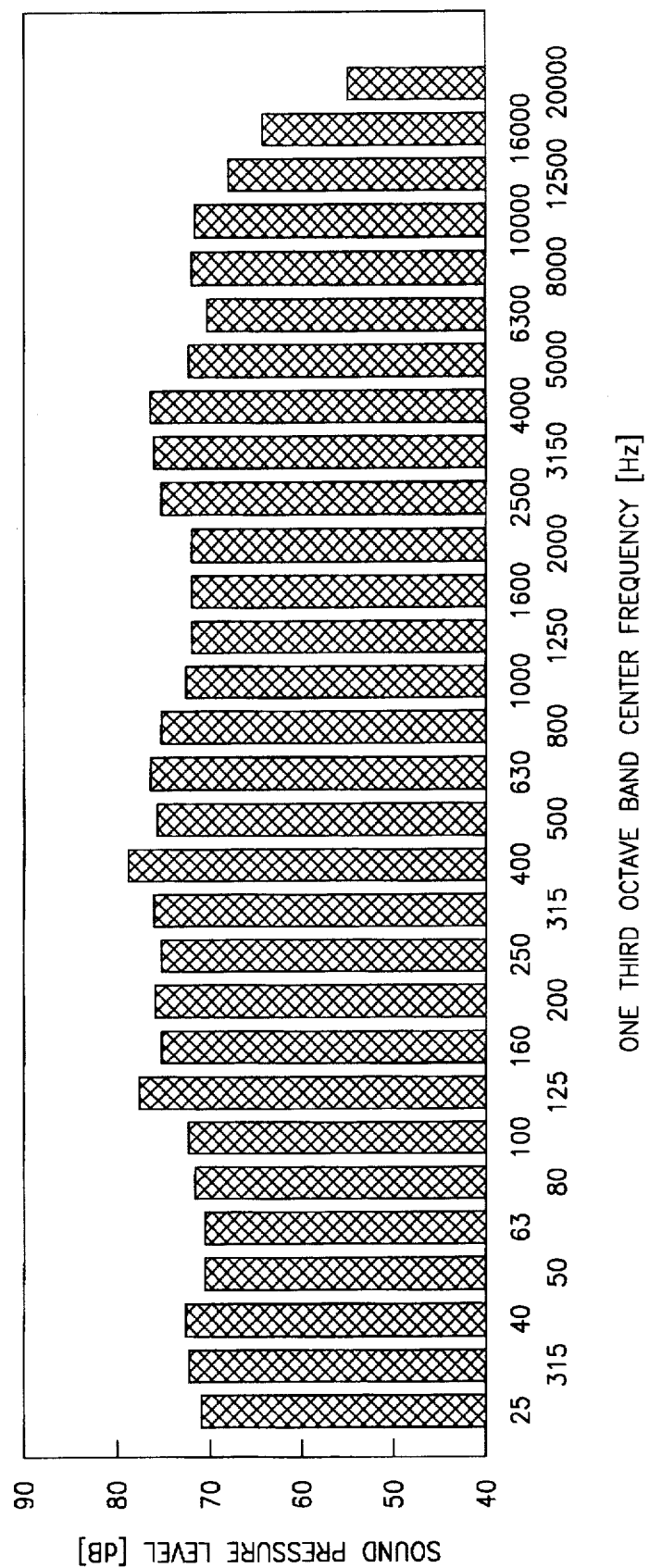
FIG. 7 is an example of a noise level measurement chart including the reduced noise level generated near a hydraulic injection molding machine powered by a water cooled electrical motor according to the present invention.

FIG. 7 is a graph indicating the noise generated by a hydraulic injection molding machine powered by water cooled electrical motor 112 in accordance with the principles of the present invention. As can be seen, the sound level measured for such a machine is clearly under and complies with the noise, safety and environmental standards in any country, i.e., the levels are substantially less than 80 dBA.

In accordance with the principles of the present invention, the targeted and achieved design criteria for the injection molding machine disclosed in accordance with the principles of the present invention include a maximum noise level under 70 dBA applicable for a plurality of variously sized water cooled electrical cabinets 118 for use with a similar variety of motors having a large range of horse powers and sizes.

For example, an electrical water cooled motor in accordance with the design standards of the present invention, having 500 horsepower may be required for injection molding machine having a 3650 metric ton clamp, as indicated in FIG. 6C, which machines are generally used in automotive applications. As shown in FIG. 6C, the noise level associated with using the design disclosed herein is reduced to equal to or less than 70 dBA, clearly meeting and actually far bettering the noise level standards required by all countries. For a motor of 250 horsepower, the noise level is reduced to under 67 dBA and for a motor of 150 horsepower, the noise level is reduced hereby to under 65 dBA.

In determining the degree of improvements disclosed herein, the assignee of the present invention has implemented a "Noise Management Program" that is based on in-house measurements conducted according to the methods contained in Canadian Standards Association (CSA), Standard Z107.56, "Procedures for the Measurement of Occupational Noise Exposure", Clause 6.5 that are compatible with the ISO/DIS 11201–11204. The noise level has been measured in various locations in the vicinity of several injection molding machines using a Bruel & Kjaer Type 2236 Precision Integrating Sound Level Meter. This meter has an A-weighting capability, an 80 dB dynamic range, a pulse capability of 83 dB and Type 1 tolerance. At each measurement location the maximum L max. and time weighted average L av. noise levels were recorded in dBA. In addition, short duration measurements were performed for specific noise sources such as the parts'ejectors. One third octave band spectra were obtained for these sources from Digital Audio Tape (DAT) recording of the noise sources using a Hewlett Packared 3569, A Real Time Analyzer. The sound metermicrophone was placed within 0.5 m of an individual's shoulder and the measurements were taken for approximately 10 minute intervals. According to these measurements, prior art hydraulic injection molding machines disclosed herein comprise a major source of noise, much of which emanates from the water cooled electrical motors that power the hydraulic pump. Unlike injection molding machine 110 using motor 112, prior art sound insulating devices, which were measured, in the form of cabinets for the motors with acoustical insulation or liners have just partially solved this problem by lowering the noise level to up to 85 dBA.

Figure 8A:
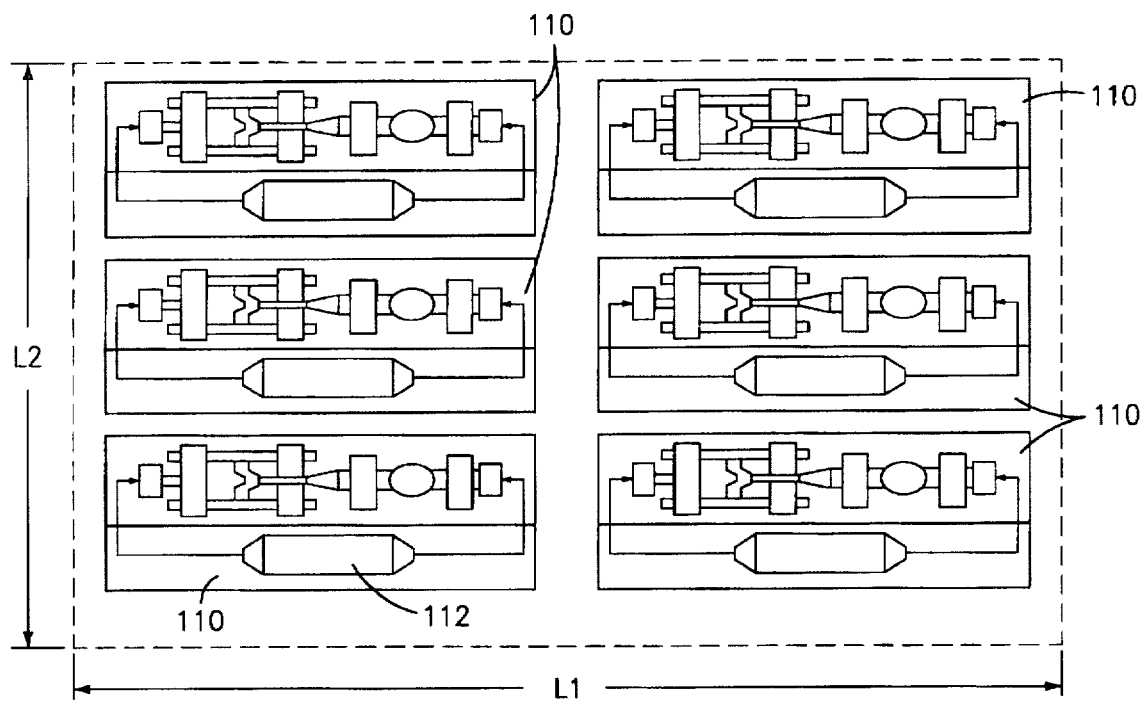
FIGS. 8A and 8B show a schematic view of two fully equipped manufacturing floors for the injection molding of plastic articles, wherein for FIG. 8A injection molding machines of the present invention are used and for FIG. 8B the injection molding machines of the prior art are used, wherein for the same floor space more machines of the present invention can be accommodated.
Figure 8B:
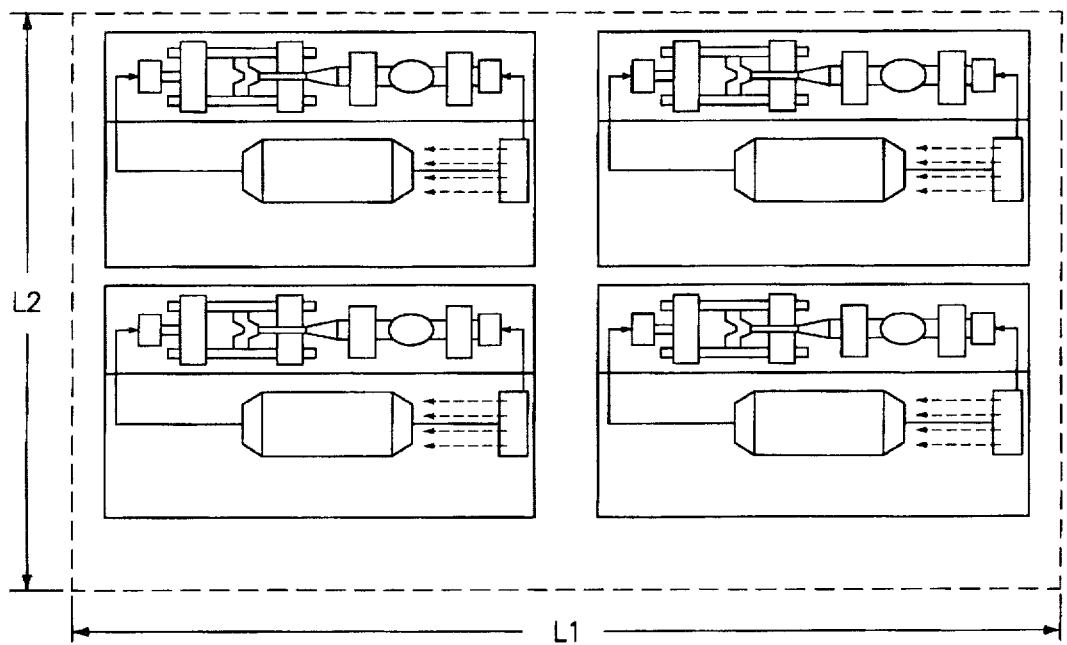

Furthermore, and in accordance with the invention disclosed herein, the state of the art plastic article manufacturing factories can be equipped with a plurality of improved hydraulic injection molding machines 110, as shown in FIG. 8A, which machines have a much smaller footprint, as compared to current factories with prior art machines, as shown schematically in FIG. 8B, thereby providing the highest output per floor space obtainable while remaining in compliance with stringent noise, temperature, energy and environmental criteria. Accordingly, for the same space L2 X L1, six injection molding machines 110 in accordance with the principles of the present invention may be used as opposed to four for the prior art. This is true, since, as discussed above, prior art hydraulic injection molding machines use air cooled motors which are much bigger than the machine 110 disclosed herein having electrical water cooled motor 112. The air cooled motors used with the prior art hydraulic injection molding machines are bigger to a degree of 20%, noisier to a degree of 10–15%, and generate heat in the plant and require more electrical energy to a degree of 25–30%, for the same horsepower output.

Further, and in accordance with the principles of the present invention, only one electrical motor 112 is used to power the hydraulic pumps that form part of the power pack of the hydraulic injection molding machine disclosed herein, and accordingly the machine design herein achieves a high noise insulation level. Since injection unit 114 is operable without any attached motor, a useful arrangement is created since an operator may easily change the plasticating screw (not shown) without interfering with an injection unit motor.

The main advantage of the present invention is that a hydraulic injection molding machine is provided having an improved and simpler sound insulation means. Another advantage of the present invention is that a hydraulic injection molding machine is provided that is compact, versatile and easier to operate, assemble and service. Still another advantage of the present invention is that a hydraulic injection molding machine is provided comprising means for quick screw and barrel change. And still another advantage of the present invention is that a hydraulic injection molding machine is provided comprising electrical driving means for the hydraulic pumps that saves energy and that is more reliable in the long run operation for the same output horse power. Still another advantage of the present invention is that a hydraulic injection molding machine is provided that is safer and environmentally friendlier.

It is to be understood that the invention is not limited to the illustrations described and shown herein, which are deemed to be merely illustrative of the best modes of carrying out the invention, and which are susceptible of modifications of form, size, arrangement of parts and details of operation. The invention rather is intended to encompass all such modifications which are within its spirit and scope as defined by the claims.

What is claimed is:

1. A hydraulic injection molding machine comprising:
   an injection unit;
   a clamp unit for clamping molds;
   at least one hydraulic pump for driving said injection and clamp units;
   an electric motor means for powering said at least one hydraulic pump, said electric motor means exhibiting an operating temperature and an operating noise level;
   liquid means for cooling said electric motor means and regulating said operating temperature;
   means for containing said liquid means adjacent said electric motor means, said means for containing having means for placing said liquid means in a configuration for insulating a surrounding environment from any of said operating noise level which measures above a prescribed level; and
   including a clamp manifold to power the clamp unit and an injection manifold to power the injection unit, wherein the liquid cooled electric motor means is operative to control the clamp manifold and injection manifold, and including a power manifold hydraulically connected to said clamp manifold and injection manifold.

2. The hydraulic injection molding machine according to claim 1, wherein said means for containing comprises a cabinet for enclosing said electric motor means and said liquid means, wherein said means for placing comprises a chamber in said cabinet for the circulation therein of said liquid means.

3. The hydraulic injection molding machine according to claim 2, further including means for circulating said liquid means through said chamber for extracting heat from said electric motor means for cooling said electric motor means.

4. The hydraulic injection molding machine according to claim 3, wherein said cabinet includes at least one input for the influx of said liquid means and at least one output for the outflux of said liquid means.

5. The hydraulic injection molding machine according to claim 3, wherein said cabinet comprises a heat exchanger.

6. The hydraulic injection molding machine according to claim 3, wherein said cabinet comprises means for reducing said operating temperature to a maximum of 40° C.

7. The hydraulic injection molding machine according to claim 2, wherein said chamber is sufficient in size for holding enough of said liquid means for maintaining operating noise levels from said electric motor means from the standpoint of said environment to said prescribed level, wherein said prescribed level is 75 dBA.

8. The hydraulic injection molding machine according to claim 1, wherein said liquid means is a coolant is the form of oil.

9. The hydraulic injection molding machine according to claim 1, wherein said electric motor means comprises is a three phase induction motor.

10. The hydraulic injection molding machine according to claim 9, wherein said induction motor includes a squirrel cage.

11. The hydraulic injection molding machine according to claim 1, further comprising a source for providing said liquid means.

12. The hydraulic injection molding machine according to claim 1, wherein via said liquid means and said means for placing, said operating noise level is attenuated from the standpoint of said environment to said prescribed level, wherein said prescribed level is 70 dBA.

13. The hydraulic injection molding machine according to claim 1, wherein via said liquid means and said means for placing, said operating noise level is attenuated from the standpoint of said environment to said prescribed level, wherein said prescribed level is 70 dBA.

14. The hydraulic injection molding machine according to claim 1, wherein via said liquid means and means for placing, said operating noise level is attenuated from the standpoint of said environment to said prescribed level, wherein said prescribed level is 67 dBA.

15. The hydraulic injection molding machine according to claim 1, wherein said means for placing comprises said means for containing having a particular shape and design which places said liquid means in said configuration.

16. The hydraulic injection molding machine according to claim 15, wherein said means for containing is a liquid cooled cabinet cooled by said liquid means, and wherein said particular shape and design comprises said cabinet having an inner cylindrical wall adjacent said electric motor means and a concentric outer cylindrical wall spaced from said inner cylindrical wall, said inner cylindrical wall and said outer cylindrical wall defining a chamber through which said liquid means flows.

17. The hydraulic injection molding machine according to claim 1, having only one electric motor means for said injection molding machine.

18. The hydraulic injection molding machine according to claim 1, further including a quick-coupling device for the removal of a plasticizing unit thereof.

19. The hydraulic injection molding machine according to claim 1, wherein said liquid means is water.

20. The hydraulic injection molding machine according to claim 1, including a chamber around said electric motor means having concentric inner and outer walls with a space therebetween for the circulation of coolant.

21. The hydraulic injection molding machine according to claim 1, including a plurality of said injection molding machines to provide a high output per unit of floor space.

22. The hydraulic injection molding machine according to claim 1, including a single electric motor means operative to power the injection unit and clamp unit.

23. The hydraulic injection molding machine according to claim 1, including means to drive the power manifold, wherein said means to drive the manifold is controlled by said electric motor means.

24. The hydraulic injection molding machine according to claim 1, including a coolant source for circulating said coolant means and a cooler to maintain the coolant at the desired temperature range.

25. The injection molding machine according to claim 1, including a controller for sending commands to the electric motor means for controlling the rate and amount of cooling therein.

26. The hydraulic injection molding machine according to claim 1, wherein said electric motor means comprises a three phase induction motor.

* * * * *

UNITED STATES PATENT AND TRADEMARK OFFICE
CERTIFICATE OF CORRECTION

PATENT NO.   : 5,707,667
DATED        : January 13, 1998
INVENTOR(S)  : JOHN GALT ET AL.

It is certified that error appears in the above-indentified patent and that said Letters Patent is hereby corrected as shown below:

In Column 2, line 18, "disolosed" should read --disclosed--.

In Column 7, line 12, "4020 C." should read --40° C.--.

In Column 10, claim 13, line 55, after "means and" "said" should be deleted.

In Column 10, claim 13, line 58, "70 dBA" should read --65 dBA--.

Signed and Sealed this

Thirty-first Day of March, 1998

Attest:

BRUCE LEHMAN

Attesting Officer

Commissioner of Patents and Trademarks